United States Patent
Manabe et al.

(10) Patent No.: US 8,088,527 B2
(45) Date of Patent: Jan. 3, 2012

(54) FUEL CELL SYSTEM

(75) Inventors: Kota Manabe, Toyota (JP); Hiroyuki Imanishi, Toyota (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 396 days.

(21) Appl. No.: 12/447,577

(22) PCT Filed: Mar. 10, 2008

(86) PCT No.: PCT/JP2008/054831
§ 371 (c)(1),
(2), (4) Date: Apr. 28, 2009

(87) PCT Pub. No.: WO2008/114761
PCT Pub. Date: Sep. 25, 2008

(65) Prior Publication Data
US 2010/0055522 A1    Mar. 4, 2010

(30) Foreign Application Priority Data
Mar. 12, 2007   (JP) .................................. 2007-061810

(51) Int. Cl.
*H01M 8/04* (2006.01)
(52) U.S. Cl. ....................................................... 429/432
(58) Field of Classification Search .................... 429/44, 429/432
See application file for complete search history.

(56) References Cited

U.S. PATENT DOCUMENTS

| | | | | |
|---|---|---|---|---|
| 5,366,821 A | * | 11/1994 | Merritt et al. | ................. 429/422 |
| 6,645,654 B2 | * | 11/2003 | Yagi | ............................... 429/413 |
| 6,939,631 B2 | * | 9/2005 | Formanski et al. | ........... 429/437 |
| 7,172,826 B2 | * | 2/2007 | Nomoto | ........................ 429/431 |
| 7,402,352 B2 | * | 7/2008 | Kamihara et al. | ............ 429/429 |
| 7,655,330 B2 | * | 2/2010 | Nomoto | ........................ 429/431 |
| 7,833,670 B2 | * | 11/2010 | Matsuzaki et al. | ............ 429/429 |
| 7,875,398 B2 | * | 1/2011 | Kokubo | ........................ 429/427 |
| 2005/0069740 A1 | | 3/2005 | Ulmer et al. | |

FOREIGN PATENT DOCUMENTS

| | | |
|---|---|---|
| EP | 1 006 601 A2 | 6/2000 |
| JP | 9-231991 A | 9/1997 |
| JP | 2000-348748 A | 12/2000 |
| JP | 2002-151117 A | 5/2002 |
| JP | 2002-204505 A | 7/2002 |
| JP | 2002-313388 A | 10/2002 |

(Continued)

*Primary Examiner* — Thanh Tam Le
(74) *Attorney, Agent, or Firm* — Kenyon & Kenyon LLP

(57) ABSTRACT

When a power generation instruction value for a fuel cell is reduced during warm-up of the fuel cell by a low power generation efficiency operation as compared to a normal operation and when supply of a reactant gas to the fuel cell cannot be controlled so as to follow the reduction of the power generation instruction value, the reactant gas supply to the fuel cell is reduced and the output voltage to the fuel cell is increased. Thus, it is possible to charge an excessive power equivalent to a difference between a fuel cell generation amount and the power generation instruction value into a capacitance component of the fuel cell, so that the power supplied to the external load of the fuel cell coincides with the power generation instruction value. Thus, when a power request for the fuel cell during the low-efficiency operation is suddenly reduced, it is possible to perform control so that the excessive power is not supplied to the external load.

9 Claims, 5 Drawing Sheets

FOREIGN PATENT DOCUMENTS

| | | |
|---|---|---|
| JP | 2003-229154 A | 8/2003 |
| JP | 2003-317765 A | 11/2003 |
| JP | 2004-030979 A | 1/2004 |
| JP | 2004-172027 A | 6/2004 |
| JP | 2006-004717 A | 1/2006 |
| JP | 2006-107948 A | 4/2006 |
| JP | 2006-286436 A | 10/2006 |
| JP | 2007-184243 A | 7/2007 |

* cited by examiner

FUEL CELL SYSTEM

This is a 371 national phase application of PCT/JP2008/054831 filed 10 Mar. 2008, which claims priority to Japanese Patent Application No. 2007-061810 filed 12 Mar. 2007, the contents of which are incorporated herein by reference.

TECHNICAL FIELD

The present invention relates to a fuel cell system in which a fuel cell is warmed up by a low-efficiency operation. More particularly, it relates to an output control method of a fuel cell in a low-efficiency operation during the running of a vehicle.

BACKGROUND ART

A fuel cell is a power generation system which oxidizes a fuel by an electrochemical process to directly convert energy discharged by an oxidizing reaction into electric energy, and the system has a stack structure in which a plurality of membrane-electrode assemblies are stacked. In each assembly, both side surfaces of an electrolytic film for selectively transporting hydrogen ions are sandwiched between a pair of electrodes made of a porous material. Above all, a solid polymer electrolyte type fuel cell in which a solid polymer film is used as an electrolyte can easily be made compact at a low cost, and additionally it has a high output density. In consequence, the use application of the fuel cell as a car-mounted power source is expected.

In this type of fuel cell, a range of 70 to 80° C. is usually considered to be an optimum temperature range for power generation, but in an environment of a cold district or another place, a long time is sometimes required from a time when the fuel cell starts to a time when the optimum temperature range is reached. Hence, various types of warm-up systems have been investigated. For example, in Japanese Patent Application Laid-Open No. 2002-313388, a technique is disclosed which controls the self-heating amount of the fuel cell by operation at a low power generation efficiency as compared to a normal operation, and warms up the fuel cell while running a vehicle. In such a technique, the output voltage of the fuel cell is set to a voltage value lower than that based on I-V characteristics (current-voltage characteristics) of the fuel cell to increase the thermal loss of the fuel cell and perform a warm-up operation by the self-heating. Therefore, any device for the warm-up does not have to be mounted, and the technique is excellent in convenience.

[Patent Document 1] Japanese Patent Application Laid-Open No. 2002-313388

DISCLOSURE OF THE INVENTION

Meanwhile, in a low-efficiency operation performed while running a vehicle, it is preferable to set the output voltage of a fuel cell to a fixed voltage value lower than a voltage value based on I-V characteristics of the fuel cell and to variably control a flow rate of an oxidizing gas to be supplied to the fuel cell in accordance with a power request. At this time, the output voltage of the fuel cell is set to the fixed voltage value capable of realizing a quick warm-up operation and obtaining the minimum motor output necessary for the running of a vehicle. Here, a reason for setting the output voltage of the fuel cell to the fixed voltage value is that in a case where the operation is controlled with the output voltage of the fuel cell which is a voltage lower than the voltage based on the I-V characteristics of the fuel cell from a viewpoint of lowering of a generation efficiency during the warm-up operation and the output voltage of the fuel cell fluctuates (rises or lowers), charging/discharging of a power from a capacitance component parasitically formed in the fuel cell occurs, and excess or deficiency is generated in the power supplied from the fuel cell to an external load (a traction motor, a car-mounted auxiliary machine or the like).

On the other hand, in a technique disclosed in Japanese Patent Application Laid-Open No. 2002-313388, as compensation for the lowering of the generation efficiency of the fuel cell during the warm-up operation, the output of the fuel cell is also decreased, and hence output control matching the power request cannot be performed. To solve such a problem, in the low-efficiency operation while running the vehicle, the output voltage of the fuel cell is set to the fixed voltage value lower than that based on the I-V characteristics of the fuel cell, whereas the flow rate of the oxidizing gas to be supplied to the fuel cell may variably be controlled in accordance with the power request.

However, fuel cell vehicles in which a fuel cell system is a car-mounted power source include a vehicle in which the oxidizing gas is supplied to the fuel cell by an air compressor. As a driving motor mounted on the air compressor, a motor having excellent response properties is employed, and the air compressor has satisfactory response properties in a case where an accelerator open degree suddenly increases. However, in many cases, a speed reducer such as a brake is not mounted on the air compressor. Therefore, the response properties are poor in the case where the accelerator open degree suddenly decreases, and hence a countermeasure to take under the present situation is to wait for the decrease of a rotation number by inertia.

Therefore, even when the accelerator open degree suddenly decreases during the low-efficiency operation while running the vehicle, the flow rate of the oxidizing gas to the fuel cell cannot suddenly be reduced, and hence an excessive power larger than a power generation instruction value is generated. This excessive power is supplied to a battery, but when a battery charging capability deteriorates in a low-temperature environment, excessive charging of the battery might sometimes be caused.

To solve the problem, an object of the present invention is to suggest a fuel cell system capable of performing control so that any excessive power is not supplied to an external load at a time when a power request for a fuel cell suddenly decreases during a low-efficiency operation.

To achieve the above object, a fuel cell system according to the present invention comprises: a fuel cell which receives supply of a reactant gas to generate a power; a reactant gas supply device which supplies the reactant gas to the fuel cell; a warm-up device which warms up the fuel cell by operation at a low power generation efficiency as compared to a normal operation; and a controller which controls the supply of the reactant gas to the fuel cell while holding the output voltage of the fuel cell at a fixed value, when a power generation instruction value for the fuel cell decreases while performing the low-efficiency operation and when the supply of the reactant gas to the fuel cell is controlled so as to follow the decrease of the power generation instruction value, the controller being configured to reduce the supply of the reactant gas to the fuel cell and to increase the output voltage of the fuel cell, thereby charging an excessive power in excess of the power generation instruction value into a capacitance component of the fuel cell, when the supply of the reactant gas to the fuel cell is not controlled so as to follow the decrease of the power generation instruction value.

According to such a constitution, when the power generation instruction value suddenly decreases during the low-efficiency operation and the supply of the reactant gas to the fuel cell cannot be controlled so as to follow the decrease of the power generation instruction value, the excessive power in excess of the power generation instruction value can be charged into the capacitance component of the fuel cell, so that the supply of the excessive power from the fuel cell to the external load can be suppressed.

The reactant gas supply device may include a regenerative brake. According to such a constitution, the supply of the reactant gas to the fuel cell may be decreased so as to follow the decrease of the power generation instruction value by regenerative braking of the regenerative brake, when the power generation instruction value for the fuel cell decreases while performing the low-efficiency operation.

The reactant gas supply device may include a mechanical brake. According to such a constitution, the supply of the reactant gas to the fuel cell may be decreased so as to follow the decrease of the power generation instruction value by the braking of the mechanical brake, when the power generation instruction value for the fuel cell decreases while performing the low-efficiency operation.

The controller may gradually decrease the power generation instruction value so that the supply of the reactant gas to the fuel cell decreases to follow the decrease of the power generation instruction value, when the power generation instruction value for the fuel cell decreases while performing the low-efficiency operation.

The fuel cell system may further include a bypass device which bypasses the fuel cell to discharge a part of the reactant gas supplied from the reactant gas supply device. According to such a constitution, the bypass device may control a bypass flow rate of the reactant gas passing through the bypass device to decrease the supply of the reactant gas to the fuel cell so as to follow the decrease of the power generation instruction value, when the power generation instruction value for the fuel cell decreases while performing the low-efficiency operation.

The fuel cell system may further include an accumulator device having a capacity sufficient for the charging of the excessive power.

Here, the capacitance component of the fuel cell is the capacitance component of an electric double layer parasitically formed on an interface between a catalyst layer and an electrolytic film of the fuel cell. A capacity value of the capacitance component depends on an oxidization reducing reaction of the catalyst layer. Moreover, the low-efficiency operation is the operation of the fuel cell at an operation point having a voltage value lower than a voltage value determined by a current-voltage characteristic curve of the fuel cell.

BEST MODE FOR CARRYING OUT THE INVENTION

Hereinafter, an embodiment according to the present invention will be described with reference to the drawings.

Figure 1:
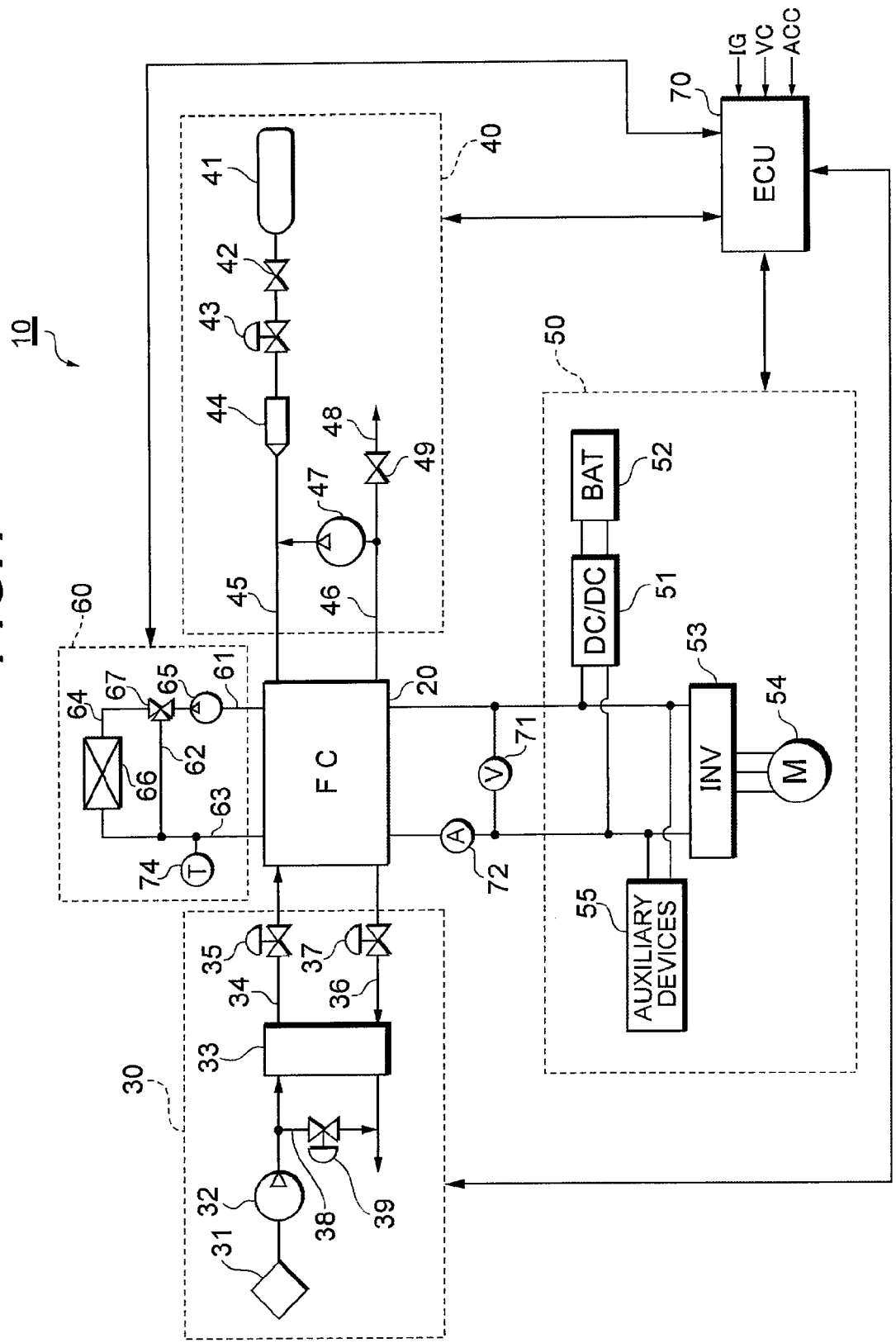
FIG. 1 is a system constitution diagram of a fuel cell system according to the present embodiment.

FIG. 1 shows a system constitution of a fuel cell system 10 according to the present embodiment.

The fuel cell system 10 functions as a car-mounted power source system mounted on a fuel cell vehicle, and includes a fuel cell stack 20 which receives supply of a reactant gas (a fuel gas, an oxidizing gas) to generate a power; an oxidizing gas supply system 30 for supplying air as the oxidizing gas to the fuel cell stack 20; a fuel gas supply system 40 for supplying a hydrogen gas as the fuel gas to the fuel cell stack 20; a power system 50 for controlling charging/discharging of the power; a cooling system 60 for cooling the fuel cell stack 20; and a controller (ECU) 70 which controls the whole system.

The fuel cell stack 20 is a solid polymer electrolytic cell stack in which a plurality of cells are stacked in series. In the fuel cell stack 20, an oxidizing reaction of formula (1) occurs in an anode pole, and a reducing reaction of formula (2) occurs in a cathode pole. In the whole fuel cell stack 20, an electromotive reaction of formula (3) occurs.

$$H_2 \rightarrow 2H^+ + 2e^- \tag{1}$$

$$(½)O_2 + 2H^+ + 2e^- \rightarrow H_2O \tag{2}$$

$$H_2 + (½)O_2 \rightarrow H_2O \tag{3}$$

To the fuel cell stack 20 are attached a voltage sensor 71 for detecting an output voltage of the fuel cell stack 20 and a current sensor 72 for detecting a power generation current.

The oxidizing gas supply system 30 has an oxidizing gas passage 34 through which the oxidizing gas to be supplied to the cathode pole of the fuel cell stack 20 flows, and an oxidizing off gas passage 36 through which an oxidizing off gas discharged from the fuel cell stack 20 flows. The oxidizing gas passage 34 is provided with an air compressor 32 which takes the oxidizing gas from the atmosphere through a filter 31, a humidifier 33 which humidifies the oxidizing gas to be supplied to the cathode pole of the fuel cell stack 20, and a throttle valve 35 for regulating an amount of the oxidizing gas to be supplied. The oxidizing off gas passage 36 is provided with a back pressure adjustment valve 37 for regulating an oxidizing gas supply pressure, and the humidifier 33 which performs water content exchange between the oxidizing gas (a dry gas) and the oxidizing off gas (a wet gas).

Between the oxidizing gas passage 34 and the oxidizing off gas passage 36 are arranged a bypass passage 38 which bypasses the fuel cell stack 20 to connect both the passages to each other and a bypass valve 39 which regulates the flow rate of the oxidizing gas flowing through the bypass passage 38. The bypass valve 39 usually closes. The bypass passage 38 and the bypass valve 39 function as bypass devices for regulating a bypass air flow rate.

The fuel gas supply system 40 has a fuel gas supply source 41; a fuel gas passage 45 through which the fuel gas to be supplied from the fuel gas supply source 41 to the anode pole of the fuel cell stack 20 flows; a circulation passage 46 for returning, to the fuel gas passage 45, a fuel off gas discharged from the fuel cell stack 20; a circulation pump 47 which feeds, to the fuel gas passage 43, the fuel off gas under pressure in the circulation passage 46; and a gas/water discharge passage 48 branched from and connected to the circulation passage 47.

The fuel gas supply source 41 is constituted of, for example, a high-pressure hydrogen tank, a hydrogen occluded alloy or the like, and receives the hydrogen gas with a high pressure (e.g., 35 MPa to 70 MPa). When a block valve 42 is opened, the fuel gas is discharged from the fuel gas supply source 41 to the fuel gas passage 45. The pressure of the fuel gas is decreased to, for example, about 200 kPa by a regulator 43 and an injector 44, to supply the gas to the fuel cell stack 20.

It is to be noted that the fuel gas supply source 41 may be constituted of a reformer which forms a hydrogen-rich reformed gas from a hydrocarbon-based fuel, and a high-pressure gas tank which brings the reformed gas formed by this reformer into a high-pressure state to accumulate the pressure.

It is to be noted that the regulator 43 is a device which adjusts the upstream pressure (the primary pressure) of the regulator into a preset secondary pressure, and is constituted of, for example, a mechanical pressure reduction valve or the like which decreases the primary pressure. The mechanical pressure reduction valve has a housing provided with a back pressure chamber and a pressure adjustment chamber formed via a diaphragm, and has a constitution in which the primary pressure is decreased to a predetermined pressure by the back pressure of the back pressure chamber to form the secondary pressure in the pressure adjustment chamber.

The injector 44 is an electromagnetic driving type opening/closing valve in which a valve body is directly driven with an electromagnetic driving force for a predetermined driving period and detached from a valve seat, whereby a gas flow rate or a gas pressure can be regulated. The injector 44 includes the valve seat having jet holes which jet a gas fuel such as the fuel gas, and also includes a nozzle body which supplies and guides the gas fuel to the jet holes, and the valve body movably received and held in an axial direction (a gas flow direction) with respect to this nozzle body to open or close the jet holes.

The gas/water discharge passage 48 is provided with a gas/water discharge valve 49. The gas/water discharge valve 49 operates in accordance with a command from the controller 70 to discharge, from the system, the fuel off gas including impurities in the circulation passage 46 and a water content. When the gas/water discharge valve 49 is opened, the concentration of the impurities in the fuel off gas of the circulation passage 46 lowers, and a hydrogen concentration in the fuel off gas to be circulated through a circulation system can be raised.

The fuel off gas discharged through the gas/water discharge valve 49 is mixed with the oxidizing off gas flowing through the oxidizing off gas passage 34, and diluted by a diluter (not shown). The circulation pump 47 is driven by a motor to circulate and supply the fuel off gas of the circulation system to the fuel cell stack 20.

The power system 50 includes a DC/DC converter 51, a battery 52, a traction inverter 53, a traction motor 54 and auxiliary machines 55. The DC/DC converter 51 has a function of raising a direct-current voltage supplied from the battery 52 to output the voltage to the traction inverter 53 and a function of lowering a direct-current power generated by the fuel cell stack 20 or a regenerative power collected by the traction motor 54 by regenerative braking to charge the battery 52. The charging/discharging of the battery 52 is controlled by these functions of the DC/DC converter 51. Moreover, an operation point (the output voltage, an output current) of the fuel cell stack 20 is controlled by voltage conversion control of the DC/DC converter 51.

The battery 52 functions as a storage source of an excessive power, a regenerative energy storage source during the regenerative braking, or an energy buffer during load fluctuation accompanying acceleration or deceleration of the fuel cell vehicle. As the battery 52, for example, a nickel/cadmium accumulator battery, a nickel/hydrogen accumulator battery, or a secondary battery such as a lithium secondary battery is preferable.

The traction inverter 53 is, for example, a PWM inverter driven by a pulse width modulation system, and converts the direct-current voltage output from the fuel cell stack 20 or the battery 52 into a three-phase alternate-current voltage in accordance with a control instruction from the controller 70 to control a rotary torque of the traction motor 54. The traction motor 54 is, for example, a three-phase alternate-current motor, and constitutes a power source of the fuel cell vehicle.

The auxiliary machines 55 generically include motors arranged in units of the fuel cell system 10 (e.g., power sources for pumps and the like), inverters for driving these motors, and any type of car-mounted auxiliary machine (e.g., an air compressor, an injector, a cooling water circulation pump, a radiator or the like).

The cooling system 60 includes refrigerant passages 61, 62, 63 and 64 for circulating a refrigerant through the fuel cell stack 20; a circulation pump 65 for feeding the refrigerant under pressure; a radiator 66 for performing heat exchange between the refrigerant and outside air; a three-way valve 67 for switching a circulation path of the refrigerant; and a temperature sensor 74 for detecting a refrigerant temperature (a stack temperature). During a normal operation after completing a warm-up operation, the opening/closing of the three-way valve 67 is controlled so that the refrigerant discharged from the fuel cell stack 20 flows through the refrigerant passages 61, 64, is cooled by the radiator 66, and then flows through the refrigerant passage 63 to flow into the fuel cell stack 20 again. On the other hand, during the warm-up operation immediately after system startup, the opening/closing of the three-way valve 67 is controlled so that the refrigerant discharged from the fuel cell stack 20 flows through the refrigerant passages 61, 62 and 63 to flow into the fuel cell stack 20 again.

The controller 70 is a computer system including a CPU, an ROM, an RAM, an input/output interface and the like, and functions as a control device for controlling the units (the oxidizing gas supply system 30, the fuel gas supply system 40, the power system 50 and the cooling system 60) of the fuel cell system 10. For example, on receiving a startup signal IG output from an ignition switch, the controller 70 starts the operation of the fuel cell system 10 to obtain a power request of the whole system based on an accelerator open degree signal ACC output from an accelerator sensor, a vehicle speed signal VC output from a vehicle speed sensor and the like.

The power request of the whole system is a total value of a vehicle running power and an auxiliary machine power. The auxiliary machine power includes a power consumed by a car-mounted auxiliary machine (the humidifier, the air compressor, the hydrogen pump, the cooling water circulation pump or the like), a power consumed by a device (a change gear, a wheel control device, a steering device, a suspension device or the like) necessary for the running of a vehicle, a power consumed by a device arranged in a passenger space (an air conditioner, a light fixture, an audio or the like) and the like.

Moreover, the controller 70 determines distribution of the output powers of the fuel cell stack 20 and the battery 52, calculates a power generation instruction value, and controls the oxidizing gas supply system 30 and the fuel gas supply system 40 so that the amount of the power to be generated by the fuel cell stack 20 coincides with a target power. Furthermore, the controller 70 controls the DC/DC converter 51 to regulate the output voltage of the fuel cell stack 20, thereby controlling the operation point (the output voltage, the output current) of the fuel cell stack 20. To obtain the target vehicle speed corresponding to an accelerator open degree, the controller 70 outputs, for example, U-phase, V-phase and W-phase alternate-current voltage instruction values as switching instructions to the traction inverter 53, and controls an output torque and a rotation number of the traction motor 54.

Figure 2:
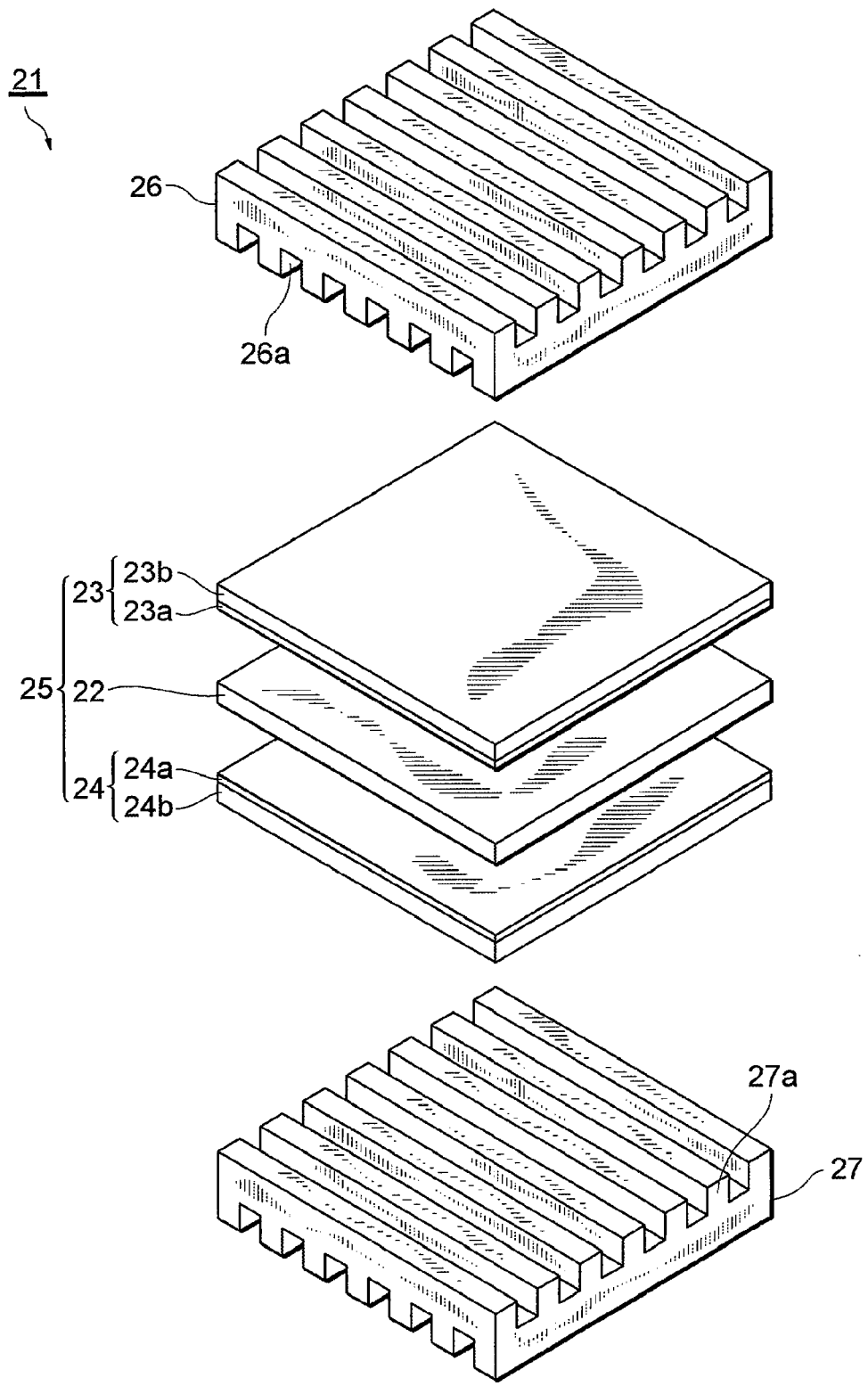
FIG. 2 is an exploded perspective view of a cell.

FIG. 2 is an exploded perspective view of a cell 21 constituting the fuel cell stack 20.

The cell 21 is constituted of an electrolytic film 22, an anode pole 23, a cathode pole 24, and separators 26, 27. The anode pole 23 and the cathode pole 24 are diffusion electrodes which sandwich the electrolytic film 22 from both sides to constitute a sandwich structure. The separators 26, 27 constituted of gas impermeable conductive members further sandwich this sandwich structure from both sides, while forming the passages of the fuel gas and the oxidizing gas between the anode pole 23 and the cathode pole 24. The separator 26 is provided with ribs 26a having recessed sections. The anode pole 23 abuts on the ribs 26a to close openings of the ribs 26a, thereby forming a fuel gas passage. The separator 27 is provided with ribs 27a having recessed sections. The cathode pole 24 abuts on the ribs 27a to close openings of the ribs 27a, thereby forming an oxidizing gas passage.

The anode pole 23 has a catalyst layer 23a including carbon powder carrying a platinum-based metal catalyst (Pt, Pt—Fe, Pt—Cr, Pt—Ni, Pt—Ru or the like) as a main component, the catalyst layer coming in contact with the electrolytic film 22; and a gas diffusion layer 23b formed on the surface of the catalyst layer 23a and having both gas permeability and electron conductivity. Similarly, the cathode pole 24 has a catalyst layer 24a and a gas diffusion layer 24b. More specifically, as to the catalyst layers 23a, 24a, the carbon powder carrying platinum or an alloy made of platinum and another metal is dispersed in an appropriate organic solvent, and an electrolytic solution is added as much as an appropriate amount, pasted and screen-printed on the electrolytic film 22. The gas diffusion layers 23b, 24b are formed of carbon cloth woven with a thread constituted of a carbon fiber, carbon paper or carbon felt. The electrolytic film 22 is a proton conductive ion exchange membrane formed of a solid polymer material, for example, a fluorine-based resin, and exerts satisfactory electric conductivity in a wet state. The electrolytic film 22, the anode pole 23 and the cathode pole 24 form a membrane-electrode assembly 25.

Figure 3:
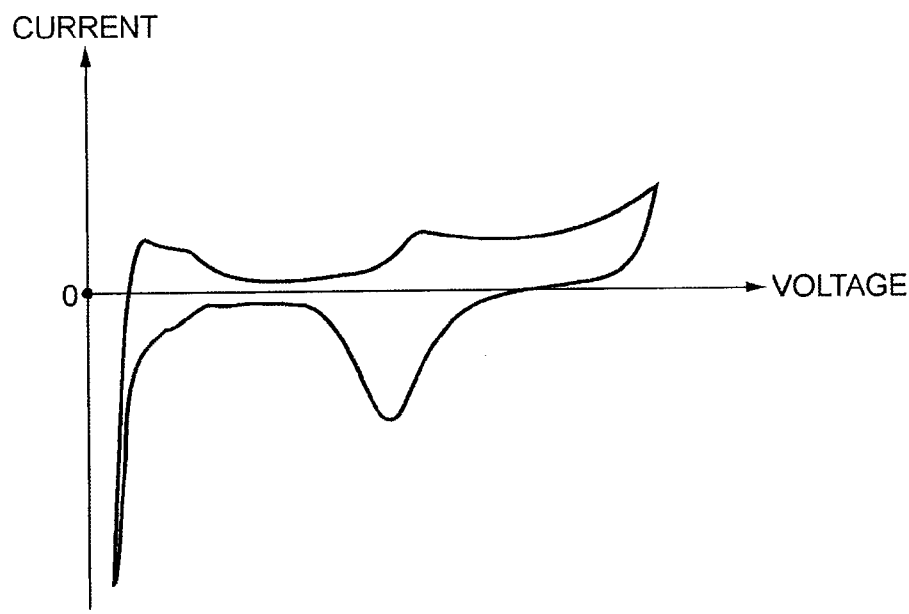
FIG. 3 is a C-V characteristic diagram of a fuel cell stack.

FIG. 3 shows C-V characteristics (a cyclic voltammogram) of the fuel cell stack 20.

The C-V characteristics show dynamic electric characteristics of the fuel cell stack 20. When the voltage of the fuel cell stack 20 is increased at a fixed speed, a current flows in a direction from the outside to the fuel cell stack 20 (a minus direction). When the voltage of the fuel cell stack decreases at the fixed speed, the current flows in a direction from the fuel cell stack 20 to the outside (a plus direction). It has been found that such dynamic electric characteristics are obtained by a capacitance component parasitically disposed in the fuel cell stack 20.

Referring to FIG. 2 again, electrons and hydrogen ions concerned with the electrochemical reaction represented by the above formulas (1) and (2) gather together on an interface between the electrolytic film 22 and the catalyst layer 23a and an interface between the electrolytic film 22 and the catalyst layer 24a, to form an electric double layer. The voltage generated by the electrons and hydrogen ions which have gathered together on the electric double layer is consumed as an energy source for activating the hydrogen gas and an oxygen gas in a ground state, respectively, and hence the voltage is generally referred to as an activating overvoltage. It is known that the electric double layer formed on the above interfaces functions as an electric energy storage source and that the dynamic electric characteristics of the layer are equivalent to those of a capacitor. When the power generation current is suddenly increased or decreased, the lowering of an ohm voltage due to an ohm resistance of the electrolytic film 22 follows the change of the power generation current with good response properties, but the activating overvoltage generated in the electric double layer cannot follow the change of the power generation current with the good response properties, and slowly settles into an equilibrium state over a certain degree of time. A reason why such a difference is generated is that the electric characteristics of the electrolytic film 22 can be modeled as a resistance element, whereas the electric characteristics of the electric double layer can be modeled as the capacitor.

Figure 4:
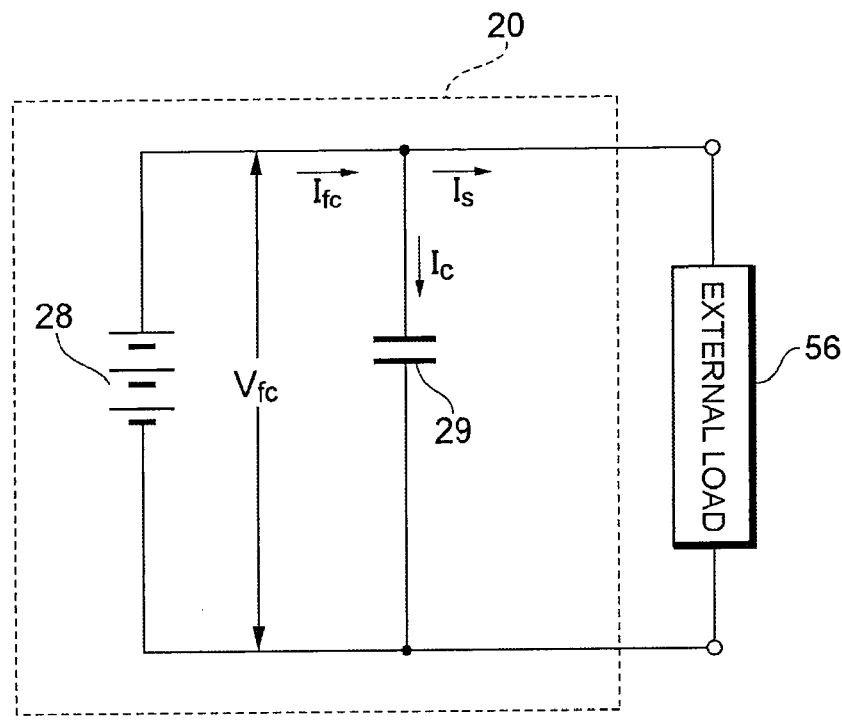
FIG. 4 is an equivalent circuit diagram of the fuel cell stack.

FIG. 4 is an equivalent circuit diagram in which the dynamic electric characteristics of the fuel cell stack 20 are modeled.

The fuel cell stack 20 has a circuit constitution in which an ideal fuel cell 28 and a capacitor 29 are connected in parallel. The ideal fuel cell 28 models a virtual fuel cell which does not have the above C-V characteristics, and performs a behavior equivalent to that of a variable power source from a viewpoint of the electric characteristics. The capacitor 29 models the electric behavior of the electric double layer formed on the above interfaces as a capacity element. An external load 56 is an equivalent circuit which models the power system 50. When the current discharged from the ideal fuel cell 28 is Ifc, the output voltage of the ideal fuel cell 28 (the output voltage of the fuel cell stack 20) is Vfc, the current flowing into the capacitor 29 is Ic, the current discharged from the fuel cell stack 20 to the external load 56 is Is, the capacity of the capacitor 29 is C, and time is t, the following equations (4) and (5) are established.

$$Ifc=Ic+Is \quad (4)$$

$$Ic=C\times\Delta Vfc/\Delta t \quad (5)$$

As shown in the equations (4) and (5), when the output voltage Vfc rises, the current Ic flowing into the capacitor 29 increases in accordance with a change amount $\Delta Vfc/\Delta t$ per unit time, and hence the current Is discharged from the fuel cell stack 20 to the external load 56 decreases. On the other hand, when the output voltage Vfc lowers, the current Ic flowing into the capacitor 29 decreases in accordance with the change amount $\Delta Vfc/\Delta t$ per unit time, and hence the current Is discharged from the fuel cell stack 20 to the external load 56 increases. The voltage rising/lowering amount of the output voltage Vfc per unit time can be controlled in this manner to adjust the current Is discharged from the fuel cell stack 20 to the external load 56 (hereinafter referred to as the $\Delta V$ control for the sake of convenience).

In the present embodiment, when the stack temperature at the startup of the fuel cell system 10 is less than a predetermined temperature (e.g., 0° C.), the low-efficiency operation while running the vehicle is performed to warm up the fuel cell stack 20. The low-efficiency operation is an operation for setting an air stoichiometric ratio to a value around 1.0 and controlling the amount of the reactant gas to be supplied to the fuel cell stack 20, to increase a power generation loss, thereby operating the system with a low generation efficiency. The air stoichiometric ratio is an oxygen surplus ratio indicating a degree of surplus of supplied oxygen with respect to oxygen necessary for reacting with hydrogen without any excess or deficiency. When the air stoichiometric ratio is set to a small value to perform the low-efficiency operation, a concentration overvoltage becomes larger than that during the normal operation, and hence the thermal loss (power generation loss) of the energy which can be taken by a reaction between hydrogen and oxygen increases.

By the low-efficiency operation while running the vehicle, the output voltage of the fuel cell stack 20 is set to the fixed voltage value lower than a voltage value based on I-V characteristics of the stack, while variably controlling the flow rate of the oxidizing gas to be supplied to the fuel cell stack 20 in accordance with a power request. Here, a reason why the output voltage of the fuel cell stack 20 is set to the fixed voltage value is that when the output voltage of the fuel cell stack 20 is fluctuated, as shown by the equations (4) and (5), the charging/discharging of the power into/from the capacitor 29 occurs owing to capacitance characteristics of the fuel cell stack 20, and the excess or deficiency is generated in the power supplied from the fuel cell stack 20 to the external load 56.

The output voltage of the fuel cell stack 20 during the low-efficiency operation is set to a voltage value capable of realizing a quick warm-up operation and obtaining the minimum motor output necessary for the running of a vehicle. From a viewpoint of early warm-up, the output voltage of the fuel cell stack 20 is preferably set to a value which is as small as possible. However, when the output voltage is excessively small, the motor output necessary for the running of a vehicle cannot be obtained sometimes, and the voltage is preferably set to a value capable of obtaining the appropriate motor output during the running of a vehicle while satisfying a warm-up performance. This does not apply to a case where an FC output end is provided with a boosting converter.

Since the output voltage of the fuel cell stack 20 during the low-efficiency operation is set to the fixed voltage in this manner, the controller 70 variably controls the amount of the oxidizing gas to be supplied to the fuel cell stack 20, to perform the power generation control in accordance with the power request (the accelerator open degree or the like). For example, the oxidizing gas flow rate to the fuel cell stack 20 is increased at a high-load time, and the oxidizing gas flow rate to the fuel cell stack 20 is decreased at a low-load time. In addition, the fuel gas supply to the fuel cell stack 20 is held at a fixed flow rate.

It is to be noted that the low-efficiency operation is performed until the stack temperature rises to the predetermined temperature (e.g., 0° C.), and the operation is switched to the normal operation, when the stack temperature reaches the predetermined temperature.

Next, there will be described a method of suppressing the excessive power supply to the external load 56 at a time when the power generation request to the fuel cell stack 20 suddenly decreases during the low-efficiency operation.

Figure 5:
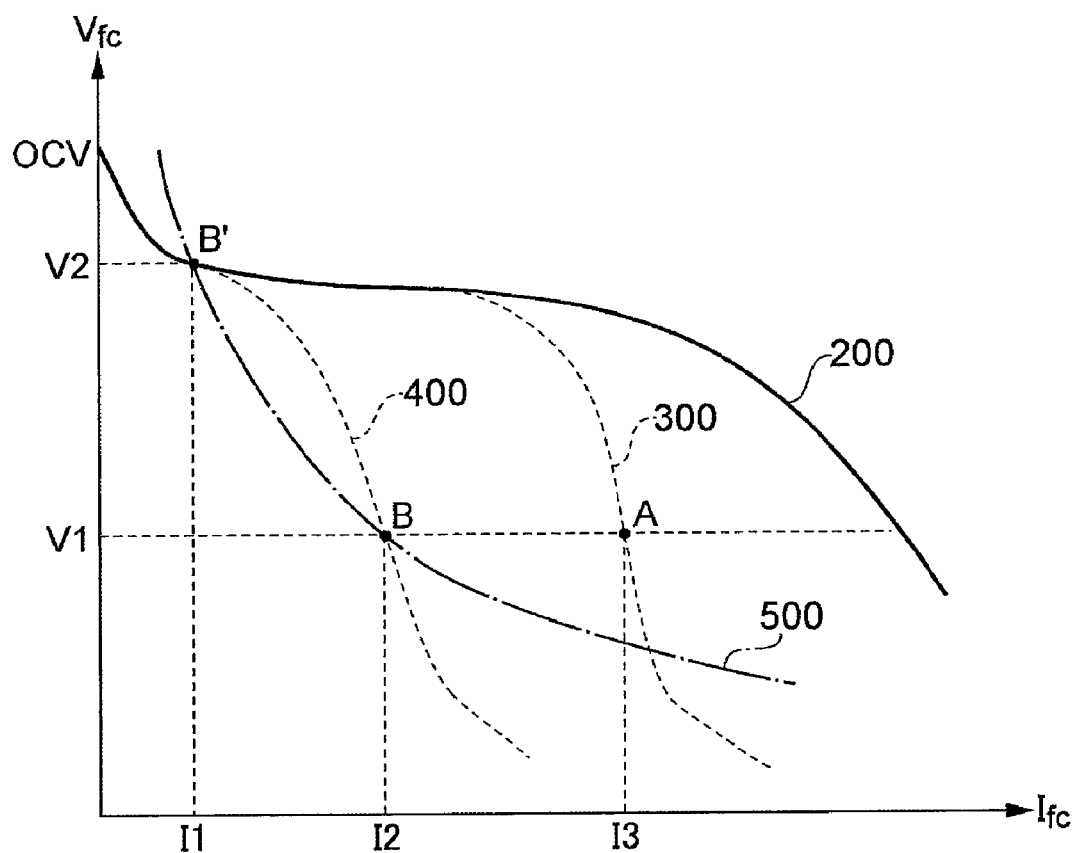
FIG. 5 is an explanatory view of an operation point of the fuel cell stack.

FIG. 5 shows the I-V characteristics of the fuel cell stack 20.

During the normal operation, to improve generation efficiency, the operation is controlled so that the operation point (the output current Ifc, the output voltage Vfc) is positioned on an I-V characteristic curve 200. On the other hand, during the low-efficiency operation, the generation efficiency is intentionally lowered to decrease the thermal loss, so that the operation point is set to a voltage point lower than the I-V characteristic curve 200, for example, the output voltage Vfc=V1. By the V low-efficiency operation, since the output voltage Vfc is fixed to V1, hence the flow rate of the oxidizing gas to be supplied from the air compressor 32 to the fuel cell stack 20 is controlled to regulate the output current Ifc, and the power generation control is performed in accordance with an operation load (e.g., the accelerator open degree).

It is to be noted that reference numerals 300, 400 show I-V characteristic curves during the low-efficiency operation.

There will be considered a case where the operation point at a time when the warm-up operation is performed while running the vehicle by the low-efficiency operation is A (I3, V1), and an operator turns off an accelerator to designate W1 as a power generation instruction value Pref. Here, an equal power line 500 is an aggregate of operation points at which a generation power is W1 (e.g., each of a generation power I2×V1 of an operation point B and a generation power I1×V2 of an operation point B' is equal to W1). The operation point after turning off the accelerator is set to one of a plurality of operation points which can be present on the equal power line 500.

Figure 6:
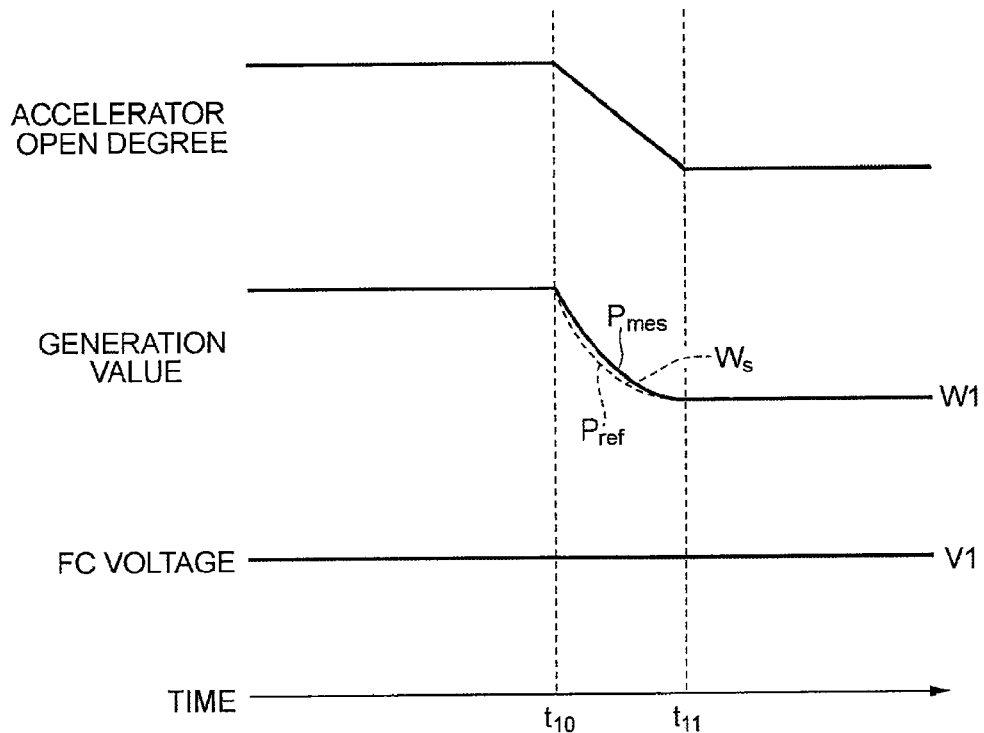
FIG. 6 is a timing chart showing a control process of ΔV control.

As shown in, for example, FIG. 6, when the accelerator open degree is gradually reduced from time t10 to time t11 with such a speed that the rotation number of the air compressor 32 can follow the accelerator open degree (power generation request), a difference is hardly made between the power generation instruction value Pref and a power generation amount Pmes, and an excessive power Ws is hardly generated. In such a case, since the flow rate of the oxidizing gas to the fuel cell stack 20 can only be reduced in accordance with the accelerator open degree to set the generation power to W1, as shown in FIG. 5, the oxidizing gas flow rate may be reduced to move the operation point from A to B so that the output current Ifc lowers from I3 to I2 while keeping the output voltage Vfc at V1.

Figure 7:
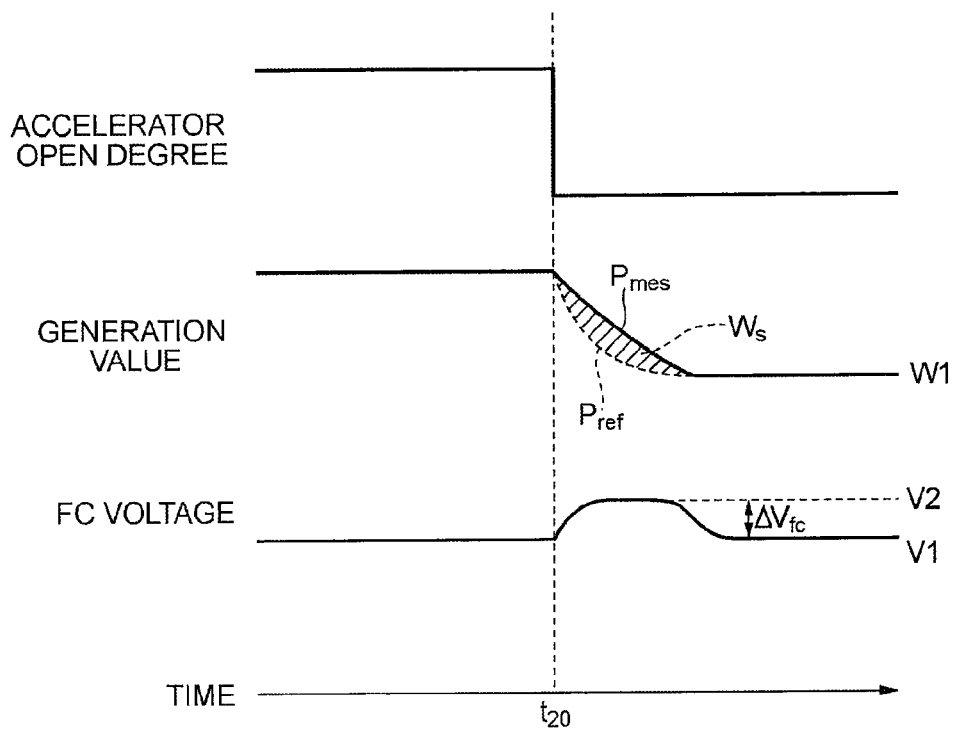
FIG. 7 is a timing chart showing the control process of the ΔV control.

On the other hand, as shown in FIG. 7, when the accelerator open degree is suddenly reduced at time t20 with such a speed that the rotation number of the air compressor 32 cannot follow the accelerator open degree (the power generation request), the air compressor 32 cannot suddenly lower the rotation number of the compressor, and inertially continues rotating with a rotation number slightly larger than that matching the power generation instruction value Pref. In consequence, the excessive power Ws corresponding to the difference between the power generation instruction value Pref and the power generation amount Pmes is generated. In such a case, the output voltage Vfc is raised as much as $\Delta V fc = V2 - V1$ by the $\Delta V$ control, and the operation point is moved from A to B' as shown in FIG. 5, to charge the excessive power Ws into the capacitor 29, so that the power value (Pmes−Ws) supplied from the fuel cell stack 20 to the external load 56 may coincide with the power generation instruction value Pref.

It is to be noted that a difference between electric energy accumulated in the capacitor 29 during a cell operation at the operation point A and electric energy accumulated in the capacitor 29 during a cell operation at the operation point B' corresponds to the excessive power Ws.

According to the present embodiment, when the power generation instruction value Pref suddenly decreases during the low-efficiency operation and the oxidizing gas supply to the fuel cell stack 20 cannot be controlled so as to follow the decrease of the power generation instruction value Pref, the output voltage Vfc can be raised to charge the excessive power Ws into the capacitor 29, so that the excessive power supply from the fuel cell stack 20 to the external load 56 can be suppressed.

It is to be noted that as countermeasures in a case where the rotation of the air compressor 32 cannot suddenly be decreased in accordance with the sudden decrease of the power generation instruction value Pref, the following measures (1) to (5) may be taken.

(1) The air compressor 32 is provided with a regenerative brake, and power regeneration by the air compressor 32 is performed while the accelerator is off, to improve deceleration response properties of the air compressor 32.

(2) The air compressor 32 is provided with a mechanical brake, to improve the deceleration response properties of the air compressor 32 while the accelerator is off.

(3) The power generation instruction value Pref is slowly decreased to such an extent that the air compressor 32 can follow the decrease while the accelerator is off. That is, the power generation instruction value Pref is slowly decreased, so that the excessive power Ws corresponding to the difference between the power generation amount Pmes and the power generation instruction value Pref decreases. When the power generation instruction value Pref is slowly decreased, the power not smaller than a power matching an operation load is set to the power generation instruction value. A technique for slowly decreasing the power generation instruction value Pref in such a range that does not influence drivability while the accelerator is off is a technique referred to as so-called accelerator annealing. When the accelerator annealing is performed, the rotation torque of the traction motor 54 slowly decreases, and hence an excessive power Ws corresponding to the difference between the power generation instruction value Pref and the power generation amount Pmes decreases. In consequence, the excessive power Ws can easily be absorbed by the $\Delta V$ control.

(4) The oxidizing gas supply from the air compressor 32 to the fuel cell stack 20 while the accelerator is off is decreased to a stable limit flow rate, and further the valve open degree of the bypass valve 39 is regulated to reduce the oxidizing gas supply to the fuel cell stack 20 to the stable limit flow rate or less. The stable limit flow rate is the minimum flow rate with which the air can be supplied in such a range capable of securing flow rate stability or response properties in a low rotation region. In a case where the capacity of the air compressor 32 is a large capacity, it is difficult to reduce the flow rate of the oxidizing gas to be supplied to the fuel cell stack 20 to the stable limit flow rate or less so that the excess or deficiency is not generated in the power supplied from the fuel cell stack 20 to the external load 56 while the accelerator is off, but according to the above constitution, the flow rate of the bypass air flowing through the bypass passage 38 can be regulated to reduce the flow rate of the oxidizing gas to be supplied to the fuel cell stack 20 to the stable limit flow rate or less so that the excess or deficiency is not generated in the power supplied from the fuel-cell stack 20 to the external load 56 while the accelerator is off.

(5) The battery 52 having a sufficient capacity is mounted to charge, into the battery 52, the excessive power Ws generated while the accelerator is off.

In the above embodiment, a utilizing configuration in which the fuel cell system 10 is used as the car-mounted power source system has been illustrated, but the utilizing configuration of the fuel cell system 10 is not limited to this example. For example, the fuel cell system 10 may be mounted as a power source of a mobile body (a robot, a ship, an airplane or the like) other than the fuel cell vehicle. Moreover, the fuel cell system 10 according to the present embodiment may be used as a power generation facility (a stational power generation system) of a housing, a building or the like.

INDUSTRIAL APPLICABILITY

According to the present invention, when a power generation instruction value suddenly decreases during a low-efficiency operation and when supply of a reactant gas to a fuel cell cannot be controlled so as to follow the decrease of the power generation instruction value, an excessive power in excess of the power generation instruction value can be charged into a capacitance component of the fuel cell, so that the supply of the excessive power from the fuel cell to an external load can be suppressed.

The invention claimed is:

1. A fuel cell system comprising:
   a fuel cell which receives a supply of a reactant gas to generate a power;
   a reactant gas supply device which supplies the reactant gas to the fuel cell;
   a warm-up device which warms up the fuel cell by a low-efficiency operation at a low power generation efficiency as compared to a normal operation; and
   a controller which reduces the supply of the reactant gas to the fuel cell while holding an output voltage of the fuel cell at a fixed value, when a power generation instruction value for the fuel cell decreases while performing the low-efficiency operation and when the supply of the reactant gas to the fuel cell is controlled so as to follow the decrease of the power generation instruction value, the controller being configured to control the supply of the reactant gas to the fuel cell and to increase the output voltage of the fuel cell, thereby charging an excessive power in excess of the power generation instruction value into a capacitance component of the fuel cell, when the supply of the reactant gas to the fuel cell is not controlled so as to follow the decrease of the power generation instruction value.

2. The fuel cell system according to claim 1, wherein the low-efficiency operation is an operation of the fuel cell at an operation point having a voltage value lower than a voltage value determined by a current-voltage characteristic curve of the fuel cell.

3. The fuel cell system according to claim 1, wherein the reactant gas supply device includes a regenerative brake, and decreases the supply of the reactant gas to the fuel cell so as to follow the decrease of the power generation instruction value by regenerative braking of the regenerative brake, when the power generation instruction value for the fuel cell decreases while performing the low-efficiency operation.

4. The fuel cell system according to claim 1, wherein the reactant gas supply device includes a mechanical brake, and decreases the supply of the reactant gas to the fuel cell so as to follow the decrease of the power generation instruction value by a braking of the mechanical brake, when the power generation instruction value for the fuel cell decreases while performing the low-efficiency operation.

5. The fuel cell system according to claim 1, wherein the controller gradually decreases the power generation instruction value so that the supply of the reactant gas to the fuel cell decreases to follow the decrease of the power generation instruction value, when the power generation instruction value for the fuel cell decreases while performing the low-efficiency operation.

6. The fuel cell system according to claim 1, further comprising:
   a bypass device which bypasses the fuel cell to discharge a part of the reactant gas supplied from the reactant gas supply device,
   wherein the bypass device controls a bypass flow rate of the reactant gas passing through the bypass device, to decrease the supply of the reactant gas to the fuel cell so as to follow the decrease of the power generation instruction value, when the power generation instruction value for the fuel cell decreases while performing the low-efficiency operation.

7. The fuel cell system according to claim 1, further comprising an accumulator device which charges the excessive power.

8. The fuel cell system according to claim 1, wherein the capacitance component is a capacitance component of an electric double layer parasitically formed on an interface between a catalyst layer and an electrolytic film of the fuel cell.

9. The fuel cell system according to claim 8, wherein a capacity value of the capacitance component depends on an oxidization reducing reaction of the catalyst layer.

* * * * *